United States Patent [19]
McGahee

[11] 3,869,821
[45] Mar. 11, 1975

[54] CONNECTOR COMBINED WITH FISHING FLOAT, LEADER, SINKER, OR LURE APPARATUS

[75] Inventor: Welbourne D. McGahee, Melbourne, Fla.

[73] Assignee: Loop A Line, Inc., Melbourne, Fla.

[22] Filed: Nov. 26, 1973

[21] Appl. No.: 419,175

[52] U.S. Cl. .............................. 43/42.49, 43/44.83
[51] Int. Cl. ...................... A01k 85/00, A01k 91/04
[58] Field of Search ........................ 43/42.49, 44.83

[56] References Cited
UNITED STATES PATENTS

| 1,254,397 | 1/1918 | Dickens | 43/42.49 X |
|---|---|---|---|
| 2,307,200 | 1/1943 | Cullerton | 43/42.49 X |
| 2,734,301 | 2/1956 | Fuqua | 43/42.49 X |
| 2,843,964 | 7/1958 | Smith | 43/44.83 X |
| 3,241,201 | 3/1966 | Chester | 43/44.83 X |
| 3,754,347 | 8/1973 | McGahee | 43/44.83 |

FOREIGN PATENTS OR APPLICATIONS

| 26,131 | 1902 | Great Britain | 43/44.83 |
|---|---|---|---|

*Primary Examiner*—Louis G. Mancene
*Assistant Examiner*—Daniel J. Leach
*Attorney, Agent, or Firm*—Warren E. Ray

[57] ABSTRACT

A connector, combined with a fishing hook, float, leader, sinker, or lure apparatus, having a vertical shaft with either a head on the lower end thereof or combined with fishing apparatus, the shaft having a vertical eye connected to a horizontal eye with a small gap or closed with brazing material whereby the bight' of a fishing line may be attached or disengaged rapidly without the tieing or untieing of knots.

10 Claims, 15 Drawing Figures

PATENTED MAR 1 1 1975

CONNECTOR COMBINED WITH FISHING FLOAT, LEADER, SINKER, OR LURE APPARATUS

This invention relates to fishing equipment, and more particularly to a connector combined with fishing apparatus representing an improvement on my U.S. Pat. No. 3,754,347 granted on Aug. 28, 1973.

BRIEF SUMMARY OF THE INVENTION

The connector is provided in combination with diverse fishing implements whereby the bight of a fishing line may be attached or disengaged rapidly without the tieing or untieing of knots. A horizontal eye is connected to a vertical eye which is connected to a vertical shaft, the shaft having a head cooperating with a hole or slot in a fishing implement or wherein the shaft is combined directly with a fishing implement as a hook or leader.

The primary object of the invention is the provision of a novel connector combined with fishing apparatus whereby such apparatus may be exchanged quickly without the necessity of tieing or untieing knots in the fishing line.

Further objects and advantages of my invention will be apparent from the following detailed description taken in conjunction with the accompanying drawings in which:

DETAILED DESCRIPTION

Figure 1:
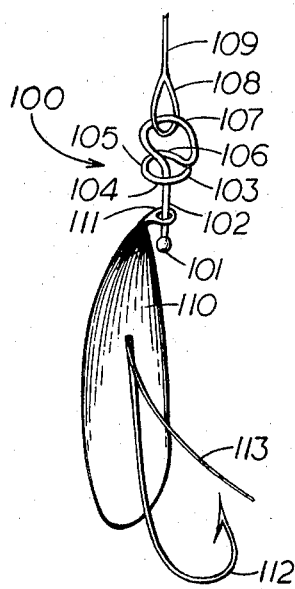
FIG. 1 shows the connector with a head cooperating with a fishing spoon.

The configuration of the horizontal eye and the vertical eye of the connector is the same in all of the figures. The connector shaft may end in a head or be combined with a fishing implement as described with reference to individual figures. Turning now to FIG. 1 the numeral 100 generally indicates the connector device having a vertical shaft 102 with a spherical head 101 on the lower end. A horizontal eye has end 103 leaving a gap between a back portion 106 of the eye and end 103 of front portion 104. A left portion 105 completes the horizontal eye which is substantially circular in shape. The numeral 107 designates a vertical eye also substantially circular in shape which is joined to both the horizontal eye and the vertical shaft. The loop 108 in fishing line 109 is shown in position after engagement in a manner which will be described in connection with FIG. 3. The fishing spoon 110 with hook 112 and anti-weed member 113 is provided with an eye 111 through which passes the vertical shaft 102. The spherical head 101 is of sufficient diameter so that it will not pass through the spoon eye 111, but the diameter of spoon eye 111 is such that the loop 108 can be passed through eye 111 even though the vertical shaft 102 occupies some of the space.

Figure 2:
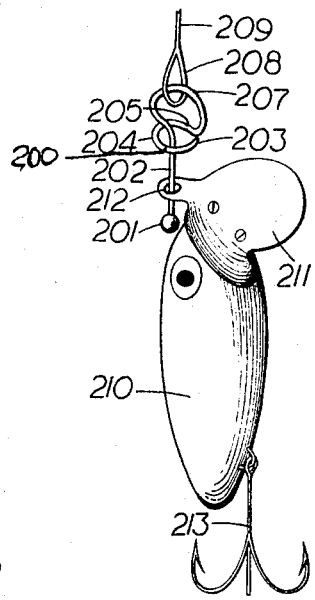
FIG. 2 is similar to FIG. 1 with the connector combined with a downplane lure.

FIG. 2 shows the connector device combined with a lure 210 having a treble hook 213 and a downplane plate 211 with a hole 212 passing vertical shaft 202 of the connector. The head 201 of shaft 202 is spherical or substantially spherical with a diameter greater than the hole 212 so that the connector is retained on the lure, but the hole 212 is such that the loop 208 of fishing line 209 can be passed through even though vertical shaft 202 takes up some of the space. The front portion 200 of the horizontal eye member has a left side 204 and an end 203 adjacent the back portion 205 of the horizontal eye member. The vertical eye member 207 is joined with the horizontal eye member and with the vertical shaft 202. It will be understood that the spherical head 201 or the spherical head 101 in FIG. 1 may be semispherical as shown at head 301 in FIG. 3.

Figure 3:
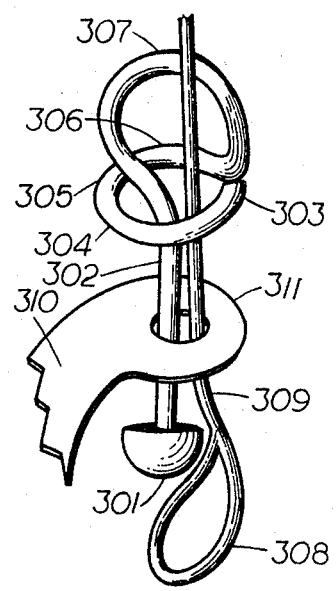
FIG. 3 illustrates how the fishing line with bight is engaged or disengaged with fishing implements such as shown in FIGS. 1 and 2.

FIG. 3 is a somewhat enlarged view of the connector cooperating with a fishing implement such as shown in FIGS. 1-2. In this figure 301 is a semispherical head on vertical shaft 302 which connects to vertical eye member 307 which in turn is connected to the back portion 306 of the horizontal eye member. The horizontal eye further includes a left portion 305, and a front portion 304 which has an end 303 leaving a small gap with respect to back portion 306. A portion of a fishing spoon is shown at 310 having an eye 311 through which eye the vertical shaft 302 passes. It will be understood that the eye 311 is somewhat exaggerated for purposes of explaining how the fishing line is attached. The fishing line 309 with loop 308 is passed adjacent the vertical shaft 302 inside the horizontal eye, through the eye 311, and the loop 308 is placed over the head 301. A pull on the line 309 will place the loop 308 in the position shown in FIGS. 1 and 2. It will be apparent that the line may be removed by reversing the process. It will be understood that fishing implements provided with the connector can be exchanged as desired without the tieing or untieing of knots in a minimum of time.

Figure 4:
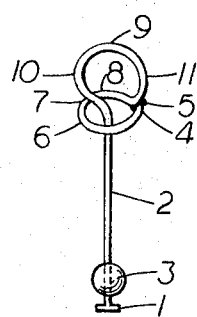
FIG. 4 depicts a connector with a modified head with bead.

FIG. 4 is a somewhat enlarged connector with modification wherein the vertical shaft 2 is provided with a flattened head 1 retaining a spherical bead 3 on the shaft. It will be understood that this modification is applicable to other figures wherein the shaft is provided with a head. Between the end 4 of the front portion 6 of the horizontal eye member and the back portion 8 of the horizontal eye member is provided brazing or soldering material 5 filling the gap shown in prior figures. The vertical eye member has a top portion 9, a left portion 10, and a right portion 11 joined with brazing 5 to the horizontal eye member end 4 and to the back portion 8 of the horizontal eye member. The left portion 7 of the horizontal eye member is comparable to the same element in prior figures, e.g., to 105 in FIG. 1. This arrangement permits added swivel action.

Figure 5:
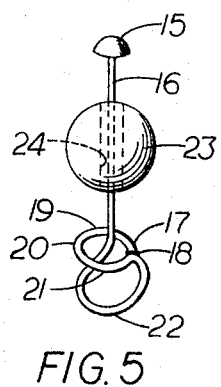
FIG. 5 shows the connector combined with a fishing weight or sinker.

The connector is combined with a sinker or weight 23 in FIG. 5. The sinker 23 is provided with a hole or bore 24 somewhat larger than necessary to pass the connector shaft 16 so as to provide space for the passage of a line with loop as shown in FIG. 3. At one end the shaft 16 is provided with a head 15, here shown as semispherical, it being understood that a flattened head as indicated in FIG. 4 or a spherical head as shown in FIG. 2 could be provided if desired. At the other end the connector comprises a vertical eye member 22 joined to the connector shaft 16 and a horizontal eye member including the end 17 of the back portion 19, a left portion 20, a front portion 21, and brazing or soldering material 18 between the end 17 and front portion 21.

Figure 6:
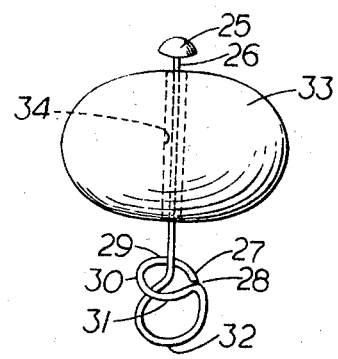
FIG. 6 illustrates the connector combined with a fishing float.

A fishing float 33, having an enlarged hole or bore 34 for passing a fishing line, is shown in FIG. 6. A semispherical head 25 is integral with the connector shaft 26 that passes through the float 33. A vertical eye member 32 is connected with the vertical shaft 26 and with a horizontal eye member having a front portion 31, a left portion 30, and a back portion 29 having an end 27. THe space between the end 27 of the horizontal eye member and the front portion thereof is filled with a brazing or soldering material 28 as in FIGS. 4 and 5, but it will be understood that a small gap could be left as in FIG. 1 for example.

Figure 7:
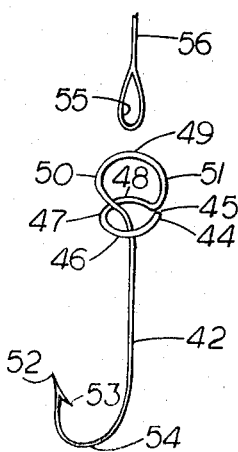
FIG. 7 shows the connector combined with a fishhook.

FIG. 7 depicts the connector combined with a fishhook wherein 42 is the connector shaft and the shank of a fishhook having a point 52, a barb 53, and the usual curved portion 54. The horizontal eye member has a front portion 46 with an end 44, a small gap 45 between end 44 and back portion 48, and a left portion 47 with the horizontal member being connected to the vertical eye member. The vertical eye member includes a top portion 49 and a right portion 51 joined with the back member 48 of the horizontal eye member. The loop 55 of fishing line 56 is passed adjacent vertical shaft 42 through the horizontal eye member, over the point of the fishhook, and a pull will place the loop in the position as in FIG. 1. It will be apparent that a fisherman can change to hooks of different sizes as may be desired in a minimum of time.

Figure 8:
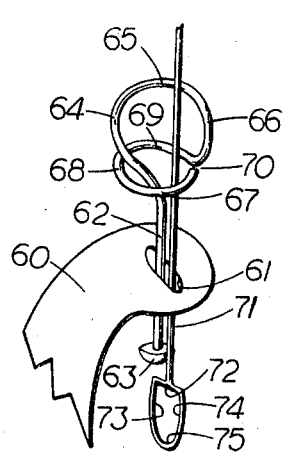
FIG. 8 is an enlarged view of the connector wherein the fishing implement is provided with a slot whereby a stiff leader with an elongated eye may be utilized.

A modification of a fishing implement may be made as in FIG. 8 whereby a stiff fishing leader with an elongated eye may be utilized. The numeral 60 indicates a portion of a fishing implement, for example those shown in FIGS. 1-2, having an elongated slot 61 for purposes to be hereinafter set forth. The connector, enlarged somewhat to show how the stiff leader is attached but similar to the connectors heretofore described, has a vertical shank 62, a head 63 on the lower end thereof, a vertical eye member with left portion 64, a top portion 65, and a right portion 66 that joins with the back portion 69 of the horizontal eye member. The horizontal eye member has a left portion 68, and a front portion 67 with an end adjacent the back portion 69 with a small gap 70. It will be understood that the gap may be filled with a brazing or soldering material as in FIGS. 4-5. The fishing leader 71 is of the stiff variety, semiflexible to some extent, but unusable with say FIGS. 1-2, with an elongated eye having an upper bend 72, a left side member 73, a right side member 74, and a lower bend 75. The loop or eye is passed through the horizontal eye, through the elongated slot 61 with flat side along the long side, and over the head 63. A pull on the leader 71 will bring the eye back through the slot 61 and into a position in the vertical eye as shown in FIG. 1. As with prior figures, the purpose is to provide apparatus whereby fishing implements may be rapidly attached and removed.

Figure 9:
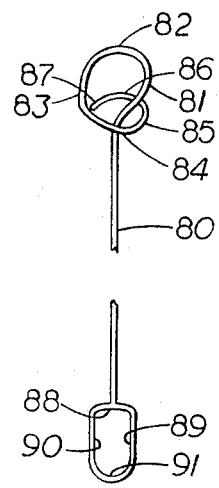
FIG. 9 depicts a stiff leader having the connector at one end and an elongated eye at the other end.

The leader 80 in FIG. 9 is a near inflexible line, i.e., of stiff wire, having an elongated eye with a right side member 89, a left side member 90, an upper bend 88, and a lower bend 91 that cooperates with the device in FIG. 8. At the end opposite the elongated eye the connector of this invention comprises a vertical eye with right portion 81, an upper portion 82, and a left portion 83 joined to a horizontal eye member with front portion 84, a right portion 85, and a back portion 86. The back portion 86 has an end 87 adjacent left portion 83 of the vertical eye and front portion 84 of the horizontal eye. The flexible fishing line loop can be passed through the horizontal eye, over the elongated eye, and with a pull end up in the position shown in FIG. 1.

Figure 10:
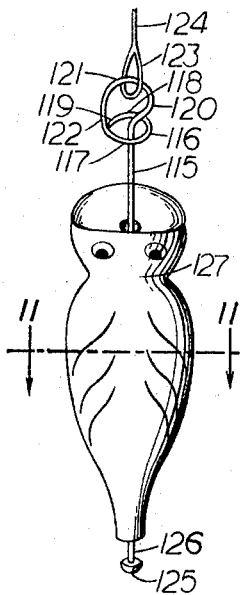
FIG. 10 shows the connector with an elongated shaft passing longitudinally through a fishing lure.
Figure 11:
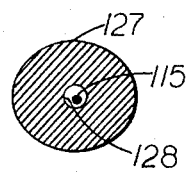
FIG. 11 is cross sectional view of FIG. 10 taken on the line 11—11.

FIG. 10 shows a slight modification of the connector for use on a popular lure, and FIG. 11 is a cross sectional view taken on the line 11—11 of FIG. 10. The connector vertical shaft 115 is elongated with a lower portion 126 so as to pass longitudinally through the lure with a lower head 125. As shown in FIG. 11 the lure 127 is provided with an oversized hole 128 whereby a loop 123 in fishing line 124 may be passed through the lure hole having the shaft 115 in a manner heretofore described. The loop 123 has a final position as shown in FIG. 10. The connector is provided with a horizontal eye member having a right portion 116, a back portion 118 with end 119, and a front portion 117 joined with the left portion 122 of a vertical eye member. The vertical eye member further includes a right portion 120 joined to connector shaft 115 and to a top portion 121.

Figure 12:
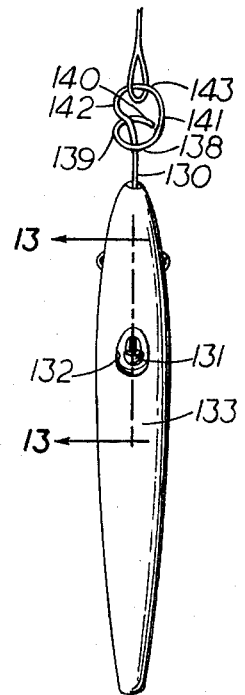
FIG. 12 is a top view of the connector combined with a fishing lure having a front pull.
Figure 13:
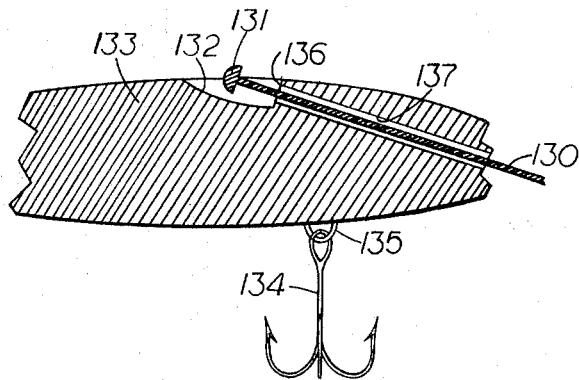
FIG. 13 is a partial cross sectional view of FIG. 12 taken on the line 13—13.

The connector is slightly modified for use with a front pull fishing lure as shown in FIG. 12 with FIG. 13 being a partial cross sectional view of FIG. 12 taken on line 13—13. The connector shaft 130 has a head 131, the former passing through an enlarged bore or hole 137 in the lure 133 from the nose upwards at an angle, and the latter cooperating with a shoulder 136 in depression 132 in the lure body. As indicated in FIG. 13 the connector shaft 130 has sufficient length so that it can be retracted for passage of the loop of a fishing line through the horizontal eye and the hole 137 and thence over the head 131 as in prior figures. An eye 135 to receive a fishhook, as treble fishhook 134, is shown as examplary of the one or more fishhooks that may be attached to the lure 133 as is conventional. The horizonatal eye member includes a front portion 138, a left portion 139, and a back portion 140. The vertical eye member has a left portion 142 joined to shaft 130, a top portion 143, and a right portion 141 joined to 138.

Figure 15:
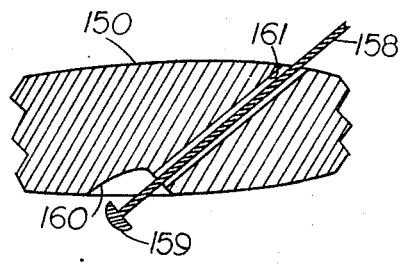
FIG. 15 is a partial cross sectional view of FIG. 14 taken on the line 15—15.
Figure 14:
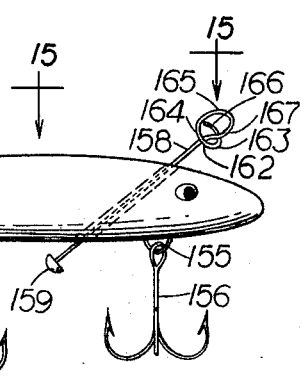
FIG. 14 shows a side view of a connector combined with a fishing lure having a top pull.

In FIG. 14 the connector is adapted to provide an up pull to lure 150 provided with back, middle, and front eyes 151, 153, 155 for treble fishhooks 152, 154, and 156. As better seen in FIG. 15, a partial cross sectional view of FIG. 14 taken on line 15—15, the elongated connector shaft 158 passes through an enlarged hole or bore 161 in the lure with a connector head 159 cooperating with depression 160. The connector shaft is joined with right portion 167 of a vertical eye member having an upper portion 165 which in turn is joined to the left portion 164 of a horizontal eye member, the latter having a front portion 162, a back portion 166, and a right portion 163. When the connector is pushed downward the head 159 is exposed so that a fishing line loop can be passed through the horizontal eye member and the bore 161 and over the head 159 as in FIG. 12.

In summary this invention provides a novel connector combined with a fishhook, float, leader, sinker, and diverse fishing lures whereby a fishing line loop may be rapidly connected or disconnected to change sizes or to change to different fishing implements without the necessity of tieing or untieing knots in the line.

While for purposes of description I have shown and described specific embodiments of my invention, it will be apparent that changes and modifications can be made therein without departing from the spirit of my invention or the scope of the appended claims.

I claim:

1. A fishing apparatus comprising a shaft means, a substantially circular vertical eye member as an integral extension of one end of said shaft means, a substantially circular horizontal eye member connected to said vertical eye member and encircling said shaft means, and fishing implement means adjacent to and connected to the other end of said shaft means including a fishing lure having a downplane plate, said downplane plate have an enlarged aperture, and wherein said shaft means passes through said downplane plate aperture and had a head on said other end of said shaft means whereby said shaft means is slidably connected to said downplane plate, said enlarged aperture providing sufficient space to permit the passage of a fishing line loop.

2. A fishing apparatus as set forth in claim 1 wherein said downplane plate aperture is an elongated slot.

3. A fishing apparatus comprising a shaft means, a substantially circular vertical eye member as an integral extension of one end of said shaft means, a substantially circular horizontal eye member connected to said vertical eye member and encircling said shaft means, and fishing implement means adjacent to and connected to the other end of said shaft means including a stiff leader integral with said other end of said shaft means, said stiff leader including elongated eye means on the distal end thereof.

4. A fishing apparatus comprising a shaft means, a substantially circular vertical eye member as an integral extension of one end of said shaft means, a substantially circular horizontal eye member connected to said vertical eye member and encircling said shaft means, and fishing implement means in the form of a lure having an enlarged bore from the nose thereof upward to the top of said lure, said shaft means passing through said fishing lure bore, and wherein said shaft means has a head on said other end of said shaft means whereby said shaft means is slidably connected to said lure, said enlarged bore providing sufficient space to permit the passage of a fishing line loop.

5. A fishing apparatus comprising a shaft means, a substantially circular vertical eye member as an integral extension of one end of said shaft means, a substantially circular horizontal eye member connected to said vertical eye member and encircling said shaft means, and fishing implement means in the form of a lure having an enlarged bore from the top to bottom of said lure, said shaft means passing through said lure bore, and wherein said shaft means has a head on said other end of said shaft means whereby said shaft means is slidably connected to said fishing lure, said enlarged bore providing sufficient space to permit the passage of a fishing line loop.

6. A fishing apparatus comprising a shaft means, a substantially circular vertical eye member as an integral extension of one end of said shaft means, a substantially circular horizontal eye member connected to said vertical eye member and encircling said shaft means, fishing implement lure means adjacent to and connected to the other end of said shaft means, said fishing implement lure means having an enlarged longitudinal bore, said shaft means passing through said fishing lure bore, said shaft means having a head on said other end of said shaft means whereby said shaft means is slidably connected to said fishing lure, and wherein said enlarged bore provides sufficient space to pass the loop of a fishing line.

7. A fishing apparatus comprising a shaft means, a substantially circular vertical eye member as an integral extension of one end of said shaft means, a substantially circular horizontal eye member connected to said vertical eye member and encircling said shaft means, and a fishing spoon with hook, said fishing spoon including an extension having an enlarged eye, and wherein said shaft means passes through said enlarged spoon eye and has a head on said other end of said shaft means whereby said shaft means is slidably connected to said fishing spoon, said fishing spoon enlarged eye providing sufficient space to permit the passage of a fishing line loop.

8. A fishing apparatus as set forth in claim 7 wherein said enlarged spoon eye is an elongated slot permitting the passage of said fishing line loop in the form of an elongated stiff leader loop.

9. A fishing apparatus comprising a shaft means, a substantially circular vertical eye member as an integral extension of one end of said shaft means, a substantially circular horizontal eye member connected to said vertical eye member and encircling said shaft means, fishing implement sinker means adjacent to and connected to the other end of said shaft means, said fishing implement sinker means having an enlarged bore, said shaft means passing through said fishing sinker bore, said shaft means having a head on said other end of said shaft means whereby said shaft means is slidably connected to said fishing sinker, and wherein said enlarged bore provides sufficient space to permit the passage of a fishing line loop.

10. A fishing apparatus comprising a shaft means, a substantially circular vertical eye member as an integral extension of one end of said shaft means, a substantially circular horizontal eye member connected to said vertical eye member and encircling said shaft means, fishing implement float means adjacent to and connected to the other end of said shaft means, said fishing implement float means having an enlarged bore, said shaft means passing through said fishing float bore, said shaft means having a head on said other end of said shaft means whereby said shaft means is slidably connected to said fishing float, and wherein said enlarged bore provides sufficient space to permit the passage of a fishing line loop.

* * * * *